Oct. 14, 1947.  J. T. FOWLER  2,429,157
CRUSHER ROLL INCLUDING REMOVABLE WEAR SEGMENTS AND INTERLOCKED TEETH
Filed Aug. 7, 1943  2 Sheets-Sheet 1

INVENTOR:
JOHN T. FOWLER,
By Chas. M. Nissen
ATTY.

Oct. 14, 1947.          J. T. FOWLER                  2,429,157
CRUSHER ROLL INCLUDING REMOVABLE WEAR SEGMENTS AND INTERLOCKED TEETH
             Filed Aug. 7, 1943           2 Sheets-Sheet 2
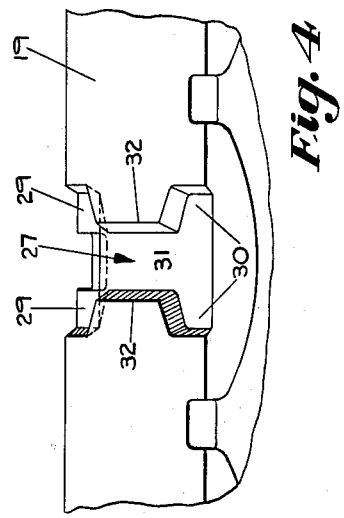
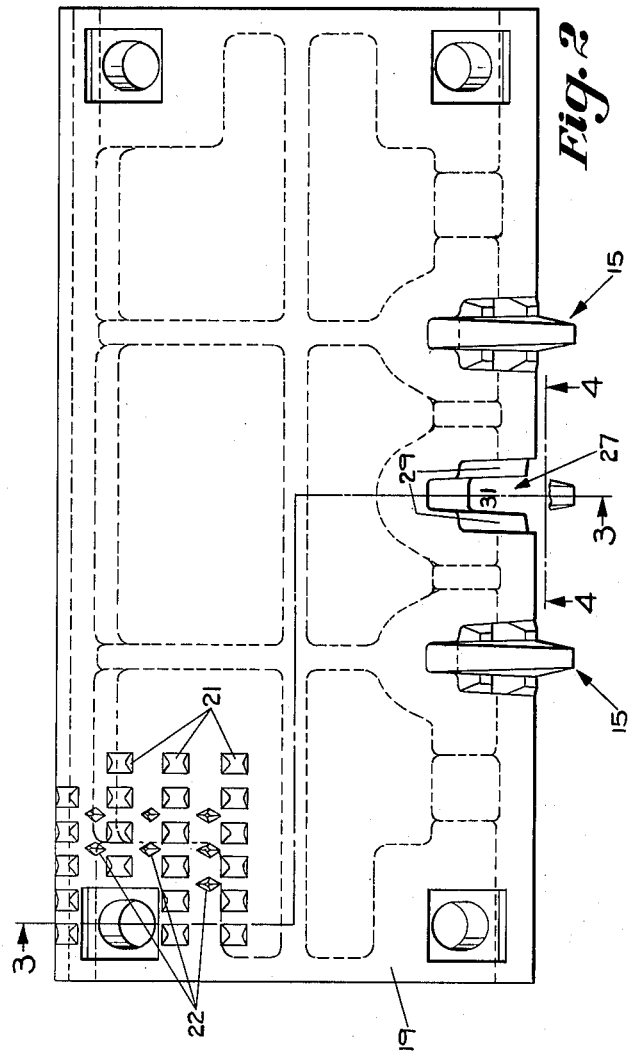
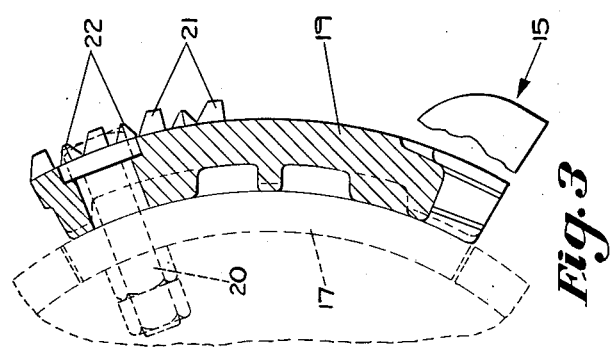
INVENTOR:
JOHN T. FOWLER,
By Chas. M. Nissen,
        ATTY.

Patented Oct. 14, 1947

2,429,157

UNITED STATES PATENT OFFICE 2,429,157

CRUSHER ROLL INCLUDING REMOVABLE WEAR SEGMENTS AND INTERLOCKED TEETH

John T. Fowler, Columbus, Ohio, assignor, by mesne assignments, to The Jeffrey Manufacturing Company, a corporation of Ohio Application August 7, 1943, Serial No. 497,812

8 Claims. (Cl. 241—294)

This invention relates to a crusher, and an object of the invention is to provide an improved rotor or roll having removable wear segments and interlocked feed teeth.

A further object of the invention is to provide improved interlocking mechanism between the removable segments of a crusher rotor and the feeding teeth thereof.

A still further object of the invention is to provide an improved structure of a feed tooth for the rotor of a crusher, such as a single roll crusher.

Other objects of the invention will appear hereinafter, the novel features and combinations being set forth in the appended claims.

In the accompanying drawings,

Fig. 2 is a plan view of a removable segment of the rotor of my invention, with one of the removable feed teeth removed;

Fig. 3 is a sectional view taken on the line 3—3 of Fig. 2 looking in the direction of the arrows;

Fig. 4 is an enlarged view taken on the line 4—4 of Fig. 2 looking in the direction of the arrows;

The structure of the crusher including that of the rotor and constituent parts follows generally the disclosure of the patent to Stanley F. Ossing et al., No. 2,212,616, for a Crusher, dated August 27, 1940, and it is to be understood that unless a contrary fact is indicated the crusher of my invention follows the disclosure of this patent.

Figure 1:
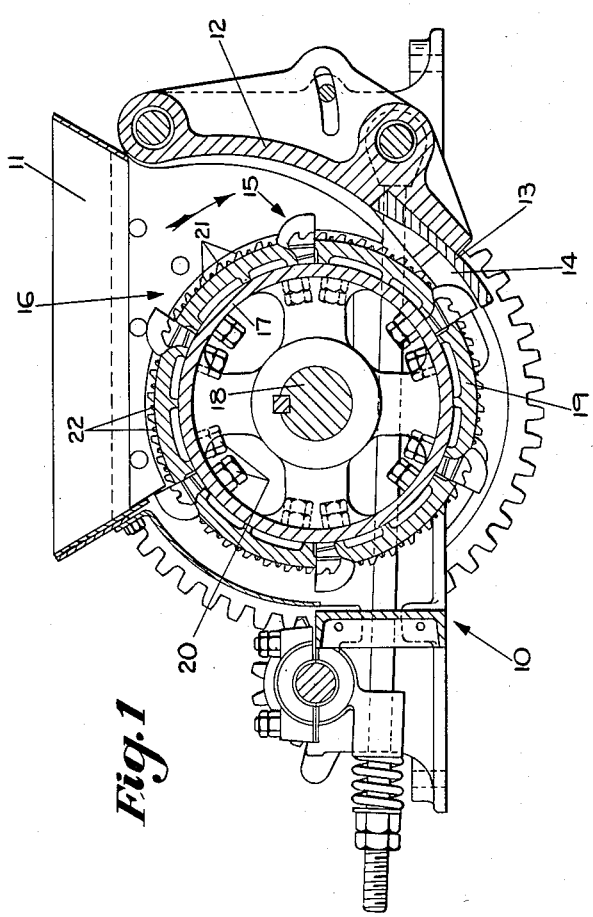
Fig. 1 is a sectional elevational view of a crusher including the features of my invention.

Briefly described, the crusher as illustrated is of the single roll type and includes a main frame 10 which provides a substantially totally enclosing housing which is preferably open at the bottom and has a top feed chute 11 leading to the interior or reducing chamber formed within the main frame housing 10. Forming a portion of said housing is a pivoted breaker plate 12 at the bottom of which there is a removable shoe 13 provided with radial grooves 14 through which the large feed teeth 15 of a rotor or roll 16 extend when the rotor is rotated in the direction of the arrow seen in Fig. 1 of the drawings.

The rotor or roll 16 includes a cylindrical drum or frame 17 having an outer cylindrical surface with spokes leading to spaced hubs mounted upon a shaft 18. Mounted upon the outer cylindrical surface of the drum or frame 17 is a plurality of arcuate segments 19, there being six such segments shown in the drawings, which when bolted to said drum 17 provide a substantially continuous cylindrical outer wearing and crushing surface. Said segments 19 are removably attached to the drum 17 by spaced bolts 20, there preferably being one such bolt 20 at each corner of the segment 19, as suggested by Fig. 2 of the drawings.

The outer surface of each segment 19 is provided with alternate longitudinally extending rows of spaced saw teeth 21 and spear point teeth 22, which teeth 21 and 22 co-operate particularly with the breaker plate 12 and the removable shoe 13 to reduce materal, such as coal, to the desired size.

The structure of the feed teeth 15 and the manner in which they are attached to the segments 19 and thus to the rotor 16, form an important feature of my invention now to be described.

Figure 5:
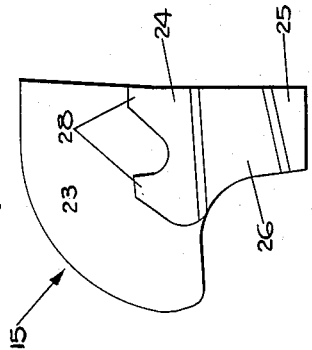
Fig. 5 is a side elevational view of a feed tooth comprising one of the features of my invention.
Figure 6:
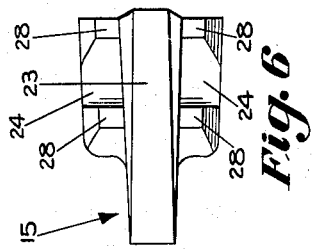
Fig. 6 is a plan view of the tooth of Fig. 5.
Figure 7:
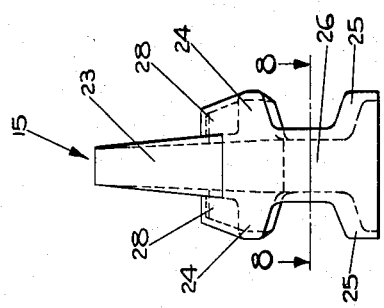
Fig. 7 is a front elevational view of the tooth of Figs. 5 and 6.

As seen by reference to Fig. 5 of the drawings, the tooth 15 includes a top or main body portion 23 generally in the form of a narrow plate which has a front flat face which extends generally along a radial plane with respect to rotor 16. The body portion 23 of said tooth 15 tapers both rearwardly and downwardly, as clearly illustrated in Figs. 6 and 7 of the drawings. Said tooth 15 includes an integral base formed by a pair of laterally extending top flanges 24 and also a pair of laterally extending bottom flanges 25 the general planes of which are at right angles to the plane of the main body portion 23, and which are integrally connected by a central base or web portion 26. Viewed in a slightly different manner, the base 26 is provided on each side with a groove which produces spaced top and bottom flanges 24 and 25 extending laterally from each side of the tooth 15.

Figure 8:
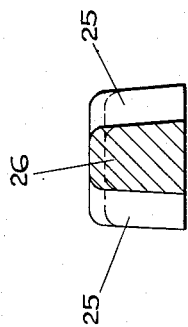
Fig. 8 is a sectional view taken on the line 8—8 of Fig. 7, looking in the direction of the arrows.

As clearly seen in Fig. 8 of the drawings, the web portion 26 and the bottom flanges 25 are tapered rearwardly and, as clearly illustrated in Fig. 5 of the drawings, the space between the top and bottom flanges 24 and 25 or, in other words, the width of the grooves in base 26, increase from the front to the rear of the tooth 15. The purpose of this is to provide a wedging action in cooperation with the opposed walls of a complex receiving notch 27 (see Figs. 2 and 4) formed in the leading edge of each segment 19 for each of the feed teeth 15 received thereby. In addition to the structure thus described, it is to be noted that each of the top flanges 24 of the tooth 15 is provided with a pair of saw teeth 28.

Attention is now directed particularly to Figs. 2 and 4 of the drawings and to the structure of the notches 27 which receive the bases 26 of the teeth 15 between opposed walls and removably hold them in place by a wedging action when the segments 19 are attached to the drum or frame 17.

As viewed from the front or leading edge of a segment 19, a notch 27 includes top and bottom wide recesses 29 and 30, respectively, and a central recess 31 of lesser width. As a consequence, there are two projections 32 which project inwardly from the lateral extremities of the top and bottom recesses 29 and 30. As best seen in Fig. 2, the notch 27 extends radially entirely through the segment 19.

All of the walls or surfaces of the notch 27 which are generally parallel with a line perpendicular to the leading face of segment 19, either converge or diverge from said leading face rearwardly so as to provide a wedging action with a cooperating surface of the tooth 15, as said tooth 15 is moved bodily rearwardly with respect to said segment 19, and when the tooth 15 is in a position so that its leading face is substantially flush with the leading face or edge of the segment 19, the tooth 15 is preferably wedged or clamped rigidly to said segment 19.

It is to be noted that this wedging or clamping action will be aided by the natural forces acting on the teeth 15 during operation, which tend to drive them in tighter wedging position. It is further to be noted that once all of the parts are assembled, each of the teeth 15 is held in place by the co-operation between adjacent segments 19. That is, the rear or trailing edge of each segment 19 clamps against the leading face of the succeeding segment and against the leading face of the teeth 15 of each succeeding segment. Therefore, to remove any tooth 15, it is necessary first to remove the segment which leads it and then drive it in a clockwise direction to disengage the wedging base 26 from the co-operating wedging or clamping walls of the notch 27.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A crusher roll including a frame, a shaft mounting said frame for rotation, a segment on said frame having a generally cylindrical outer surface with teeth thereon and a transversely extending radial edge, a notch in said segment edge extending radially therethrough and providing laterally spaced wedging surfaces, a removable tooth having a base extending into said notch and clamped on opposite sides between said laterally spaced wedging surfaces, said base including spaced-apart upper and lower flanges extending laterally from an interconnecting central portion.

2. A crusher roll including a frame, a shaft mounting said frame for rotation, a segment on said frame having a generally cylindrical outer surface with teeth thereon and a transversely extending radial edge, a notch in said segment edge and providing laterally spaced wedging surfaces, a removable tooth having a base extending into said notch and clamped on opposite sides between said laterally spaced wedging surfaces, said base including spaced-apart upper and lower flanges extending laterally from an interconnecting central portion.

3. A removable crusher tooth including an upwardly extending generally plate shaped body having a base including upper and lower integral spaced flanges extending laterally outwardly from said plate body and in planes at right angles to the plane of said body and teeth on said top flange.

4. A removable crusher tooth including an upwardly extending body having a base including upper and lower integral spaced flanges extending laterally outwardly from said plate body and in planes at right angles to the plane of said body, and teeth on said top flange.

5. A crusher roll including a frame having a plurality of removable cylindrical segments thereon, at least one of said segments having a notch in its leading edge, a removable tooth, means removably attaching at least one segment to said frame with the leading edge of said one segment closely adjacent the trailing edge of the adjacent segment to prevent removal of said tooth when said segments are attached to said frame, said tooth having a base extending into said notch to lock said tooth to said one segment, said base having spaced top and bottom flanges extending from opposite sides thereof, said notch having elements of said one segment forming tapered projections extending between said base flanges and on opposite sides of said tooth base and cooperating therewith to lock said tooth to said one segment.

6. A crusher roll including a frame having a plurality of removable cylindrical segments thereon, at least one of said segments having a notch in its leading edge, a removable tooth, means removably attaching at least one segment to said frame with the leading edge of said one segment closely adjacent the trailing edge of the adjacent segment to prevent removal of said tooth when said segments are attached to said frame, said tooth having a base extending into said notch to lock said tooth to said one segment, said base having spaced top and bottom flanges extending from opposite sides thereof, said notch having elements of said one segment forming projections extending between said base flanges and on opposite sides of said tooth base and cooperating therewith to lock said tooth to said one segment.

7. A removable crusher tooth including a body having a locking base, said base including integral spaced top and bottom flanges extending laterally outwardly from opposite sides and extending outwardly beyond said tooth body, and crusher teeth on said top flanges.

8. A crusher tooth including an upwardly extending body, a base for said tooth body, and smaller teeth formed on said base and at least in part separate from said body and also extending upwardly.

JOHN T. FOWLER.

REFERENCES CITED

The following references are of record in the file of this patent:

UNITED STATES PATENTS

| Number | Name | Date |
|---|---|---|
| 1,491,418 | Plaisted | Apr. 22, 1924 |
| 1,630,021 | Lusas | May 24, 1927 |
| 1,864,973 | Buchanan | June 28, 1932 |
| 216,807 | Richmond | June 24, 1879 |
| 1,944,928 | Davis | Jan. 30, 1934 |
| 239,349 | Sherck | Mar. 29, 1881 |
| No number | Beamont | May 6, 1836 |
| 194,776 | Hull | Sept. 4, 1877 |
| 2,212,616 | Ossing | Aug. 27, 1940 |
| 1,052,037 | Callan | Feb. 4, 1913 |
| 396,785 | Wagner | Jan. 29, 1889 |
| 449,438 | Frantz | Mar. 31, 1891 |